2 Sheets—Sheet 1.

J. HAPPE & W. NEWMAN,

Said NEWMAN assignor to said HAPPE.

QUILTING MACHINE.

No. 10,009. Reissued Jan. 17, 1882.

WITNESSES:

Carl Karp

Jos. N. Rosenbaum

INVENTOR

John Happe and

Wenzeslaus Newman

BY Paul Goepel

ATTORNEY

2 Sheets—Sheet 2.

J. HAPPE & W. NEWMAN,

Said NEWMAN assignor to said HAPPE.

QUILTING MACHINE.

No. 10,009. Reissued Jan. 17, 1882.

WITNESSES:

Carl Kapp

Fol. N. Rosenbaum

INVENTOR

John Happe and Wenzeslaus Newman

BY Paul Goepel

ATTORNEY

UNITED STATES PATENT OFFICE.

JOHN HAPPE AND WENZESLAUS NEWMAN, OF NEW YORK, N. Y.; SAID NEWMAN ASSIGNOR TO SAID HAPPE.

QUILTING-MACHINE.

SPECIFICATION forming part of Reissued Letters Patent No. 10,009, dated January 17, 1882.

Original No. 130,715, dated August 20, 1872. Application for reissue filed February 5, 1881.

*To all whom it may concern:*

Be it known that we, JOHN HAPPE and WENZESLAUS NEWMAN, of the city of New York, in the county and State of New York, have invented certain new and useful Improvements in Quilting-Machines, of which the following is a specification.

This invention relates to an improved sewing-machine for quilting, in which the material to be stitched is fed to the sewing mechanism by means of feed-rolls and zigzag lines obtained by imparting to the entire sewing mechanism a laterally-reciprocating motion by mechanism hereinafter described.

Figure 2:
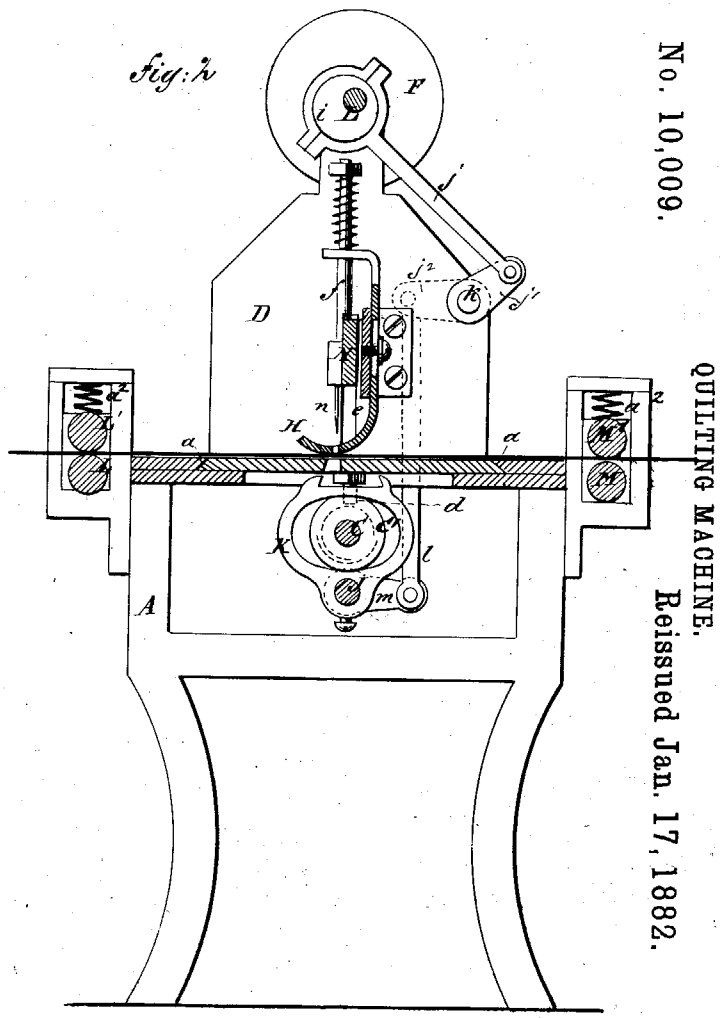
Figure 1:
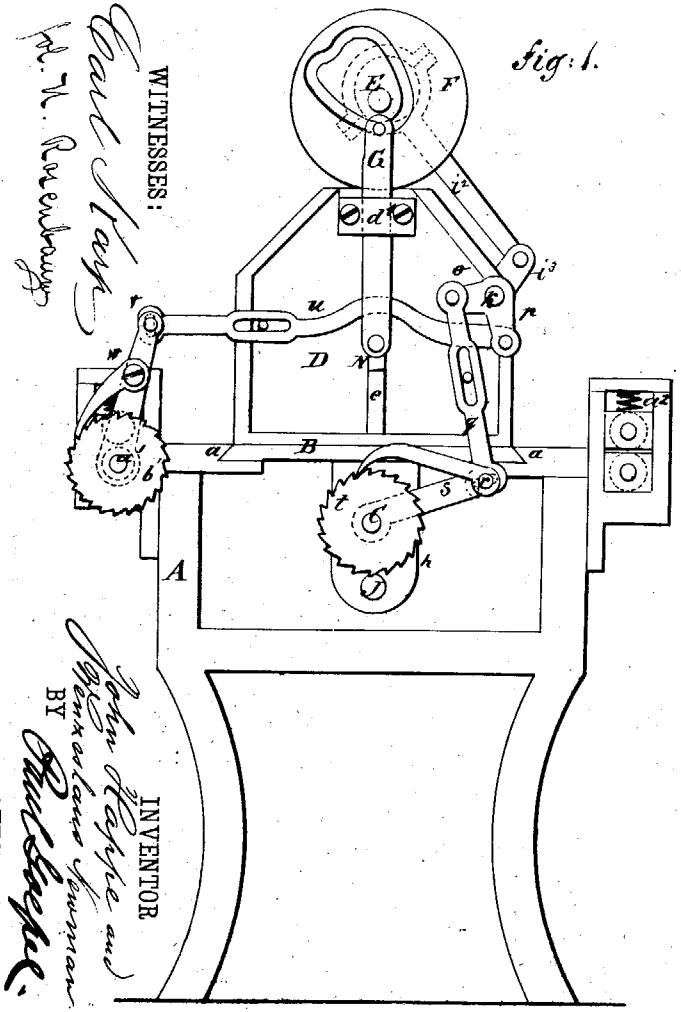
Figure 3:
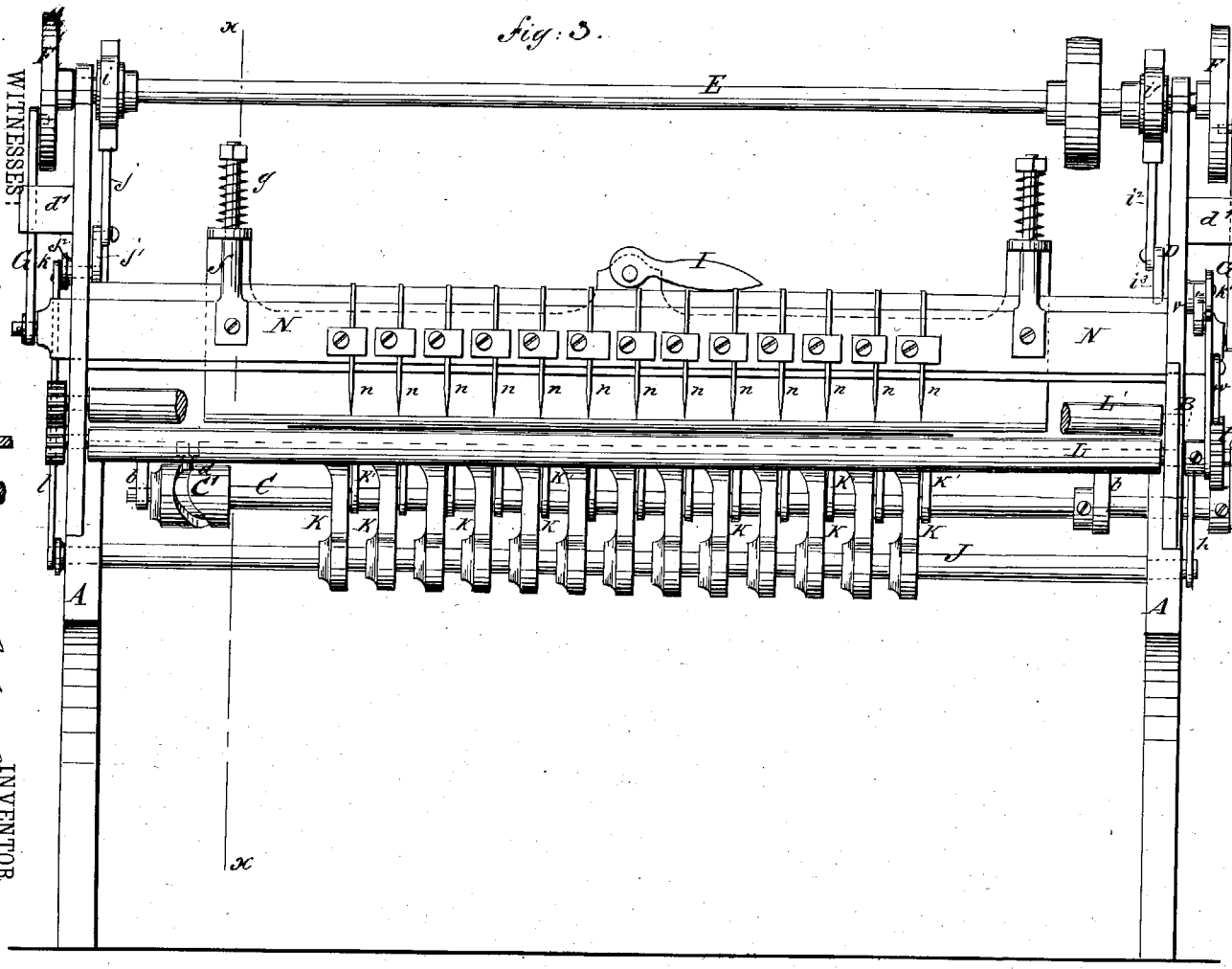
Figure 4:
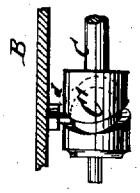

In the accompanying drawings, Figure 1 represents an end elevation of our improved quilting-machine. Fig. 2 is a vertical transverse section on line *x x*, Fig. 3. Fig. 3 is a front elevation of the same, with parts broken away; and Fig. 4 is a detail side view of the pattern-cam for imparting laterally-reciprocating motion to the sewing-machine carriage.

Similar letters of reference indicate corresponding parts.

Referring to the drawings, A designates the main frame of our improved quilting-machine, which is provided with transverse guideways *a a*, between which is fitted the carriage B, carrying an organized sewing mechanism. The main frame A supports, in fixed hangers *b b*, a shaft, C, at one end of which is mounted a grooved cam, C′, that engages a pin, *d*, projecting from the sewing-machine carriage B, so that by revolving the shaft C a laterally-reciprocating motion is imparted to the carriage and entire sewing mechanism in the guideways *a*. The cam C′ is grooved at its circumference. The different elements which compose the sewing mechanism are all supported upon the laterally-reciprocating carriage B, also the actuating mechanism for the same, so that all reciprocate at the same time over the material or fabric to be sewed, and stitch the same according to the pitch and shape of the track or groove upon the cam.

The material to be sewed is fed to the sewing mechanism by means of rolls L L′, which are mounted in bearings at the front of the supporting-frame A, and receive a step-by-step motion by suitable mechanism connected with the mechanism for imparting motion to the elements of the sewing mechanism. The rolls L L′ extend along the entire width of the frame A, and are geared together and compressed by means of springs $a^2$, so that both rolls receive a positive motion by the action of the transmitting mechanism. The material to be sewed is drawn by the drawing-rolls L L′ through the sewing mechanism, and guided thereto by a second pair of rolls, M M′, which are arranged at the opposite side of the main frame A, said guide-rolls being geared together and compressed by springs in the same manner as the drawing-rolls L L′. The rolls M M′ receive no positive motion, except by the fabric passing between them, and serve simply to keep the material flat down upon the table or cloth-plate.

In sewing quilts two sheets of muslin or other textile fabric are used, with a layer of wadding interposed. The sheets are fed to the rolls M M′, and just before they reach said rolls the wadding is spread on the lower sheet and then conducted, with the sheets, to the sewing mechanism.

At both sides of the sewing-machine carriage are arranged vertical standards D D, the upper ends of which form the bearings for a driving-shaft, E. On the ends of the shaft are mounted cams F F, which engage by grooves or tracks of proper shape with studs projecting from the upper ends of vertical slides G G, that move up and down in suitable guides, *d′*, secured to the standards D. The lower ends of said slides are connected to the needle-bar N, which extends through guide-slots *e* in the standards D, so that by revolving the driving-shaft E a vertically-reciprocating motion is imparted to the needle-bar. In this needle-bar are secured a series of needles, *n*, and from its top extend two rods, *f*, which form the guides for the presser-foot H. This presser-foot is depressed by springs *g*, wound round the rods *f*, and it can be raised against the action of these springs by a cam-lever, I. Said presser-foot is perforated with a series of holes corresponding in number and position to the needles *n*.

From the bottom surface of the sewing-machine carriage extend two hangers, *h*, Fig. 1, which form the bearings for an auxiliary shaft, J, on which are mounted the shuttle-carriers K. These shuttle-carriers move close to the shuttle-races K′, and are slotted for the cam-shaft C. The shaft J receives an oscillating motion from the eccentric *i*, which is mounted on the driving-shaft E, near one end thereof. This eccentric is connected by an arm, *j*, with a crank, *j′*, on the inner end of a short rock-shaft, *k*, which latter is provided at its outer end with a crank, $j^2$, which is connected by rod *l* with a crank, *m*, on one end of said shaft J. The cam-shaft C and drawing-rolls L receive motion from an eccentric, *i′*, mounted near the opposite end of the driving-shaft E. This eccentric *i′* is connected by an arm, $i^2$, with a crank, $i^3$, on the inner end of a short rock-shaft, *k′*.

On the outer end of the rock-shaft *k′* is mounted a bell-crank lever, *o p*, (see Fig. 1,) one arm, *o*, of which connects by a sliding lever, *q*, with a pin, *r*, which projects from a lever-pawl, *s*, said lever being provided with a slot, so that it can slide on the pin *r* as the sewing-machine carriage receives a reciprocating motion. The lever *s* swings on the cam-shaft C, and the pawl engages a ratchet-wheel, *t*, mounted on the said shaft, so that when the driving-shaft revolves a step-by-step motion is imparted to the cam-shaft C. By means of the grooved cam this step by-step motion is transmitted to the laterally-reciprocating carriage B.

From the arm *p* of the oscillating bell-crank lever *o p* extends a guided slide-lever, *u*, which connects by a pivot, *v*, with the lever-pawl *w*, which swings on the shaft *a′* of the lower drawing-roll, L. The pawl *w* engages the teeth of a ratchet-wheel, *b′*, mounted on the end of the shaft *a′*, so as to impart a step-by-step motion to the lower drawing-roll, L. This is transmitted to the upper drawing-roll, L′, and, by means of the material to be sewed, to the guide-rolls M M′ at the other end of the supporting-frame. The fabric to be sewed passes over the cloth-plate of the carriage, being held in position for the descending needles by the drawing and guide rolls. These do not move with the sewing mechanism, as they have no laterally-reciprocating motion, but revolve in fixed bearings of the stationary main frame A. The drawing and guide rolls act intermittently—rest during the formation of the stitch and feed the fabric again when the needles are out of the fabric. The carriage and sewing mechanism move also intermittently—rest with the feed device and move simultaneously therewith when the needles are raised above the fabric.

Having thus described our invention, we claim as new and desire to secure by Letters Patent—

1. The combination of the cam-shaft C and its actuating mechanism, the rock-shaft J and its actuating mechanism, and the shuttle-carriers K on said rock-shaft, provided with slots, whereby they are adapted to straddle the cam-shaft, substantially as described.

2. The presser-foot having a series of holes, and its actuating mechanism, consisting of springs *g*, rod *f*, and cam-lever I, in combination with shuttle-carriers K, shuttle-races K′, eccentric *i*, oscillating shaft J, rock-shaft *k*, rod *l*, crank *m*, and with the carriage-reciprocating mechanism, and with geared feed-rolls and the mechanism actuating them, substantially as described.

3. The cam *c* upon the shaft C, operating the needle-carriage through the pin *d*, in combination with the shuttle-carriers K, needles *a*, presser-foot H, rock-shaft J, and the gear mechanism for actuating the feed, all arranged substantially as described.

In testimony that we claim the foregoing as our invention we have signed our names, in presence of two witnesses, this 18th day of January, 1881.

JOHN HAPPE.
WENZESLAUS NEWMAN.

Witnesses:
PAUL GOEPEL,
CARL KARP.